United States Patent
Tucker et al.

(10) Patent No.: US 9,857,158 B2
(45) Date of Patent: ***Jan. 2, 2018

(54) ESTIMATING THICKNESS OF A MATERIAL LAYER ON AN AIRCRAFT

(71) Applicant: Bell Helicopter Textron Inc., Fort Worth, TX (US)

(72) Inventors: Brian Tucker, Fort Worth, TX (US); Paul Madej, Grand Prairie, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,405

(22) Filed: Jun. 9, 2016

(65) Prior Publication Data

US 2016/0290779 A1    Oct. 6, 2016

Related U.S. Application Data

(63) Continuation of application No. 14/062,387, filed on Oct. 24, 2013, now Pat. No. 9,389,071.

(51) Int. Cl.
*H04Q 5/22* (2006.01)
*G01B 7/06* (2006.01)
(Continued)

(52) U.S. Cl.
CPC .............. *G01B 7/06* (2013.01); *G01B 15/02* (2013.01); *G06K 7/0008* (2013.01);
(Continued)

(58) Field of Classification Search
CPC ...... G01B 15/02; G01B 7/06; G06K 19/0723; G06K 19/07749; G06K 7/0008; G07C 9/00111; H04B 17/0057; H04B 17/15
See application file for complete search history.

(56) References Cited

U.S. PATENT DOCUMENTS

| | | | | |
|---|---|---|---|---|
| 8,860,566 B2 * | 10/2014 | Elstorpff | ............... | F16D 66/021 188/1.11 R |
| 2002/0072878 A1 * | 6/2002 | Kanehira | ............... | G01N 17/00 702/183 |

(Continued)

FOREIGN PATENT DOCUMENTS

| | | |
|---|---|---|
| JP | 2004-294288 | 10/2004 |
| JP | 2004294288 A | * 10/2004 |

OTHER PUBLICATIONS

NDT Resource Center, Ultrasound and Ultrasonic Testing, Apr. 2007, all pages.*

(Continued)

*Primary Examiner* — Quang D Pham

(57) ABSTRACT

In some aspects, a wireless system is configured for estimating a thickness of a material layer on a surface of an aircraft. The wireless system includes a tag device located beneath a material layer. The tag device is capable of transmitting an electromagnetic signal in response to an electromagnetic signal. In some aspects, a transceiver device is configured to estimate the thickness of a material layer on a surface of an aircraft. The transceiver can be configured to communicate with a tag using electromagnetic signals. The transceiver can include one or more processors configured to measure signal strength and correlate the signal strength to the thickness of a material layer.

26 Claims, 6 Drawing Sheets

(51) Int. Cl.
*G07C 9/00* (2006.01)
*G06K 19/07* (2006.01)
*G06K 19/077* (2006.01)
*G06K 7/00* (2006.01)
*G01B 15/02* (2006.01)
*H04B 17/15* (2015.01)
*H04B 17/318* (2015.01)

(52) U.S. Cl.
CPC ... *G06K 19/0723* (2013.01); *G06K 19/07749* (2013.01); *G07C 9/00111* (2013.01); *H04B 17/15* (2015.01); *H04B 17/318* (2015.01)

(56) References Cited

U.S. PATENT DOCUMENTS

| | | | | |
|---|---|---|---|---|
| 2006/0052978 A1* | 3/2006 | Hopkins | ............... | G01B 17/02 702/170 |
| 2006/0132351 A1* | 6/2006 | Le Sesne | ............ | G01F 23/2845 342/124 |
| 2006/0220864 A1* | 10/2006 | Sano | ................. | G06K 7/10178 340/572.1 |
| 2007/0205953 A1* | 9/2007 | Bombay | .............. | G06K 19/025 343/841 |
| 2007/0252719 A1 | 11/2007 | Ray | | |
| 2010/0182131 A1* | 7/2010 | Balthes | .............. | G06K 19/0717 340/10.4 |
| 2011/0270537 A1* | 11/2011 | Wong | ................... | G01N 29/265 702/39 |
| 2012/0273192 A1* | 11/2012 | Schmidt | ............... | E21B 47/122 166/250.1 |
| 2012/0281810 A1* | 11/2012 | Kang | ..................... | A61B 6/482 378/62 |
| 2012/0286786 A1* | 11/2012 | Schellekens | ....... | G01R 33/3415 324/322 |
| 2012/0286948 A1* | 11/2012 | Ganapathy | ............. | B65G 43/02 340/539.1 |
| 2013/0185950 A1* | 7/2013 | Oode | ....................... | G01B 7/06 33/783 |
| 2013/0328693 A1* | 12/2013 | Mohamadi | ............... | G01V 3/30 340/854.6 |
| 2014/0027633 A1* | 1/2014 | Kuwabara | ............ | G01B 15/025 250/307 |
| 2014/0191904 A1* | 7/2014 | Illerhaus | ............... | G01S 5/0257 342/464 |
| 2014/0217966 A1* | 8/2014 | Schneider | ........... | B60L 11/1829 320/108 |
| 2014/0338453 A1* | 11/2014 | Engelbart | ............ | G01N 29/043 73/600 |
| 2014/0353370 A1* | 12/2014 | Hendry | ................... | G01V 15/00 235/375 |
| 2015/0042367 A1* | 2/2015 | Kim | ......................... | G01B 7/06 324/699 |
| 2015/0170109 A1* | 6/2015 | Sakuragi | ................ | B65G 43/02 705/7.25 |

OTHER PUBLICATIONS

Wikipedia, Ultrasonic Testing, Feb. 2009, all pages.*
Communication Pursuant to Article 94(3) EPC issued in European Application No. 13194426.6 dated May 7, 2014; 5 pages.

* cited by examiner

ESTIMATING THICKNESS OF A MATERIAL LAYER ON AN AIRCRAFT

CROSS-REFERENCE TO RELATED APPLICATIONS

The present application is a Continuation of and claims priority to U.S. application Ser. No. 14/062,387, filed Oct. 24, 2013, now U.S. Pat. No. 9,389,071, and titled ESTIMATING THICKNESS OF A MATERIAL LAYER ON AN AIRCRAFT, the entire contents of which is hereby incorporated for all purposes.

TECHNICAL FIELD

The following relates to estimating a thickness of a material layer on an aircraft.

BACKGROUND

A material layer on a surface of an aircraft can wear over time, reducing the thickness of the layer. In some cases it is desirable that the thickness of the material layer be monitored for safety or performance reasons. The relevant part of the aircraft is typically removed so that the layer thickness can be measured.

SUMMARY

This description relates to a wireless system for estimating thickness of a material layer on an aircraft. In some aspects, a wireless system is configured for estimating a thickness of a material layer on a surface of an aircraft. The wireless system includes a tag device located beneath a material layer. The tag device is capable of transmitting an electromagnetic signal in response to an electromagnetic signal. In some aspects, a transceiver device is configured to estimate the thickness of a material layer on a surface of an aircraft. The transceiver can be configured to communicate with a tag using electromagnetic signals. The transceiver can include one or more processors configured to measure signal strength and correlate the signal strength to the thickness of a material layer.

DESCRIPTION OF DRAWINGS

Like reference symbols in the various drawings indicate like elements.

DETAILED DESCRIPTION

Figure 1A:
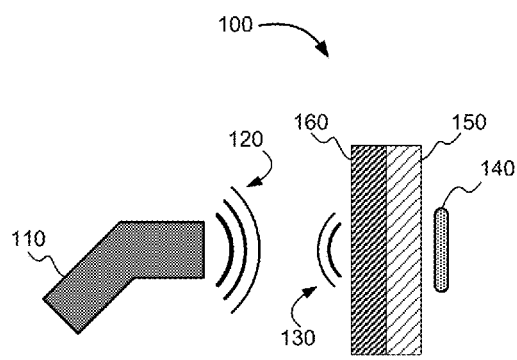
FIG. 1A is a schematic diagram of an example wireless thickness estimation system.
Figure 1B:
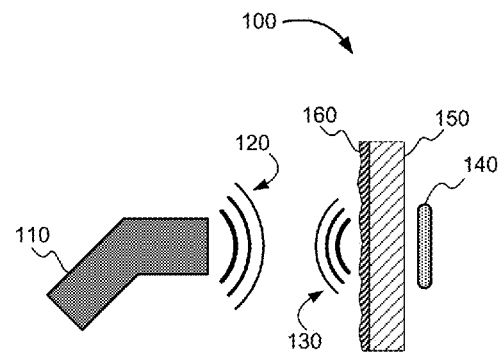
FIG. 1B is a schematic diagram of an example wireless thickness estimation system.

FIG. 1A and FIG. 1B are diagrams showing an example wireless system 100 for estimating layer thickness. The example wireless system 100 includes a transceiver device 110 and a tag device 140. The tag device 140 is located behind or beneath material layers 150, 160. The material layers 150, 160 can be a coating, substrate, or other layer on a surface of an aircraft. For example, a material layer can be an erosion-resistant coating such as epoxy-based carbon fiber and epoxy-based carbon nantotubes. The transceiver device 110 and the tag device 140 are configured to send and receive electromagnetic signals. For example, the tag device 140 can receive signals 120 sent by the transceiver device 100, and the transceiver device 110 can receive signals 130 sent by the tag device 140.

The example tag device 140 can be a passive or active device such as a Radio Frequency Identification (RFID) tag. In some cases, the tag device 140 is configured to send a signal 130 in response to receiving a signal 120. The electromagnetic signal 130 can include identification data, location data, status data, or other information. The electromagnetic signals 120, 130 can be any electromagnetic signal, with frequencies including radio frequency, high frequency, ultra-high frequency or other frequencies. In some cases, the electromagnetic signals 120, 130 include multiple frequencies or frequency ranges. The electromagnetic signals 120, 130 can be transmitted through the material layers 150, 160. The material layers 150, 160 can be one or more coatings or layers on a surface of an aircraft or aircraft part. For example, one or more of layers 150, 160 can be a sacrificial layer on a rotor blade of a vertical lift aircraft.

The example transceiver device 110 can be a handheld or portable device, or be a component incorporated into a separate device. The transceiver device 110 can be configured to process received signals 130. For example, the transceiver device 110 can contain one or more modules that analyze the strength of the signal 130 and correlate the signal strength to material or structural properties (e.g., layer thickness). In some implementations, the transceiver device 110 includes a display that presents the material or structural properties. For example, the transceiver device 110 could display the estimated thickness of a material layer. In some implementations, the transceiver device 110 communicates with a separate computer or display via wired or wireless connection.

FIG. 1A depicts the wireless system 100 in an example in which the material layers 150, 160 are at their full thickness. For example, if material layer 160 is a coating, FIG. 1A shows a new material layer 160 immediately after application. The tag device 140 is located beneath the layers 150, 160, and transmits a signal 130 through the layers 150, 160 in response to receiving a signal 120 from transceiver device 110. The signal 130 is attenuated by reflection or absorption during propagation through the material layers 150, 160. The material layers 150, 160 may be plastics, composites, metals, natural fiber materials, epoxy-based carbon fiber, epoxy-based carbon nantotubes, or other materials.

FIG. 1B depicts the wireless system 100 of FIG. 1A at a later time in which material layer 160 has eroded, abraded, corroded, or otherwise diminished, reducing the thickness. For example, friction during use can wear a coating on the external surface of an aircraft. In FIG. 1B, the signal 130 transmitted by the tag device 150 is less attenuated (i.e. is stronger) because the material layer 160 is thinner. A thinner material layer 160 can reflect or absorb less of the electromagnetic signal 130. The transceiver device 110 can compare the original attenuated strength from signal 130 shown in FIG. 1A with the less attenuated strength shown in FIG. 1B. Based on the comparison between signal strengths, the transceiver device 110 can estimate the thickness of layer 160 that has been lost to erosion or abrasion. If the signal strength through a full thickness (e.g. FIG. 1A) is known, then the remaining thickness of the layer can be calculated or otherwise estimated.

Figure 2:
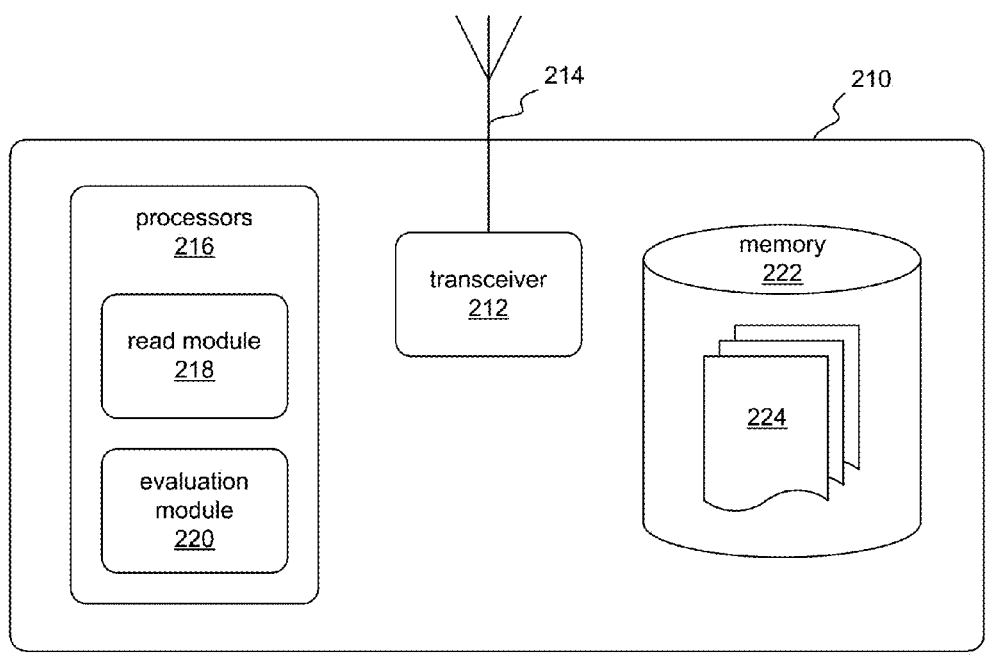
FIG. 2 is a schematic diagram of an example transceiver device.

FIG. 2 is a schematic diagram showing an example transceiver device 210, such as the transceiver device 110 shown in FIG. 1. The transceiver device 210 includes a transceiver 212 that wirelessly communicates using an antenna 214. The transceiver device 210 also includes one or more processors 216. Example processors include a read module 218 and an evaluation module 220. The transceiver device 210 also includes a memory module 222, configured to store one or more documents 224. The components in the example transceiver device 210 can be connected or otherwise communicate with each other. For example, the evaluation module 220 could access or manipulate data stored in the memory module 222. The components can also be located in a separate device, such as a separate computer. For example, the evaluation module 220 could be located in a separate computer that communicates with the transceiver device 210 via a wired or wireless connection.

The example transceiver 212 is connected to the antenna 214. The transceiver 212 is configured to send and receive electromagnetic signals via the antenna 214. For example, the transceiver 212 can send an electromagnetic signal (e.g., a radio-frequency transmission or a high-frequency transmission) to a tag device. The transceiver 212 can also receive an electromagnetic signal from a device such as a tag device.

The example processors 216 can be implemented within the transceiver device 210. The processors 216 can include one or more software or hardware modules. The example read module 218 is a software or hardware module configured to process the signal received from a tag device. For example, the read module 218 could determine identification data from the signal or the signal strength. The example evaluation module 220 is a software or hardware module configured to process the information from the read module 218. In some cases, the evaluation module 220 can also access other modules, such as information stored in the memory 222. The evaluation module 220 can be configured to process the information with an algorithm, for example an algorithm to perform statistical analysis on some or all the information, including forecasting a trend. In some cases, the evaluation module 220 is configured to calculate an estimated layer thickness based on the strength of the signal received from a tag device.

The example memory module 222 includes documents 224. The documents 224 can be files containing information. For example, the documents 224 can contain data received from the processors 216. The documents 224 can contain other information, such as log data, tag identification data, estimated thickness data, or tables or lists of data.

The transceiver device 210 can also include other modules or components. For example, the transceiver device 210 may include a display. The transceiver device 210 may also include a sensor to detect when the transceiver device 210 is properly positioned over a tag device. When the transceiver device is properly positioned over a tag device, an audible alarm could sound or a message could appear on a display. The transceiver device 210 could also include modules for communicating with over devices, such as over a wireless connection or over a wired connection.

Figure 3:
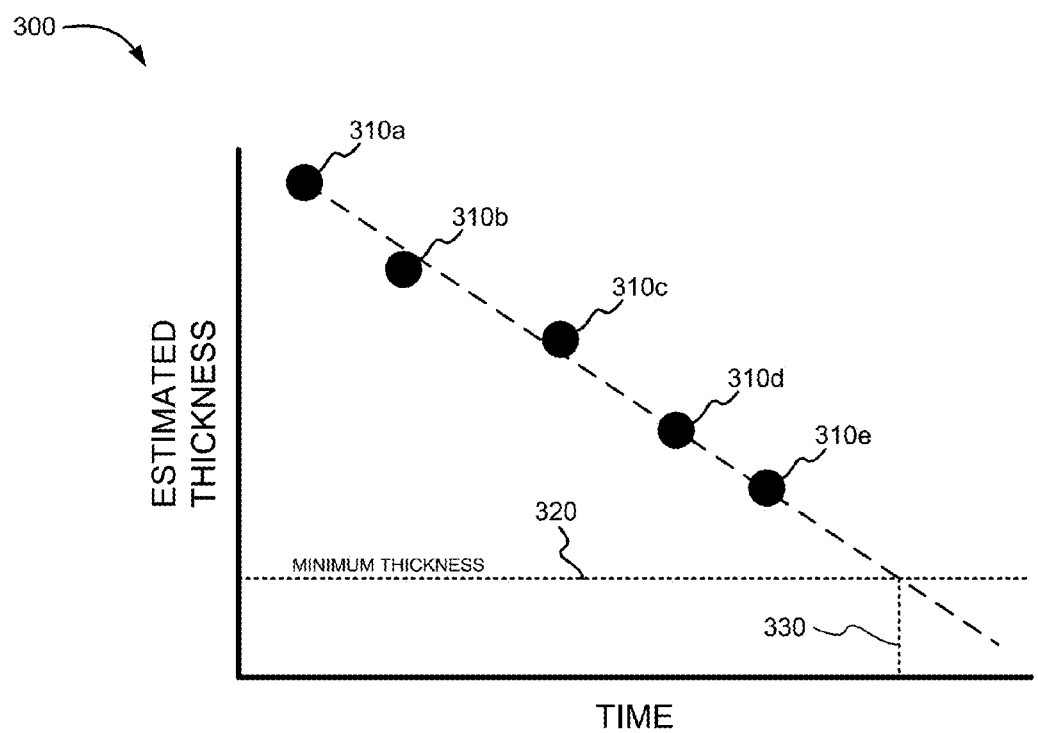
FIG. 3 is an example plot diagram showing thickness measurements over time.

FIG. 3 shows an example diagram 300 of estimated thicknesses of a material layer over time. The estimated thicknesses can be determined using the wireless system of FIG. 1. In diagram 300, individual estimations of layer thickness are shown at points 310a, 310b, 310c, 310d, and 310e. Each point 310a, 310b, 310c, 310d, and 310e represents a measurement of estimated thickness taken at a certain time. The points 310a, 310b, 310c, 310d, 310e are representative, and more or fewer points can be acquired or analyzed. In diagram 300, the x-axis represents the time each measurement is taken. The time scale can be any appropriate time scale such as days, months, or years. In some cases, the time scale can represent other values such as the number of flights or the cumulative flight time (e.g., in hours) of an aircraft. In some cases, a threshold thickness 320 can be specified. For example, if the measured layer thickness is less than the threshold thickness 320, the user may be notified that the layer should be replaced or repaired.

The point 310a can represent the first layer thickness measurement of a set of measurements. In some cases, point 310a can represent the estimated thickness of a layer that is new and not eroded. As the material layer erodes over time, each subsequent measurement of estimated thickness (i.e., points 310b, 310c, 310d, 310e) can be a smaller value. In some cases, these points can show a trend of decreasing thickness over time. Statistical analysis of the points (e.g. trend forecasting) can generate an estimation of the time 330 the layer thickness will erode to the threshold thickness 320. Thus, the part or layer can be replaced or repaired approximately at or before the layer thickness erodes beyond the threshold thickness 320.

Figure 4A:
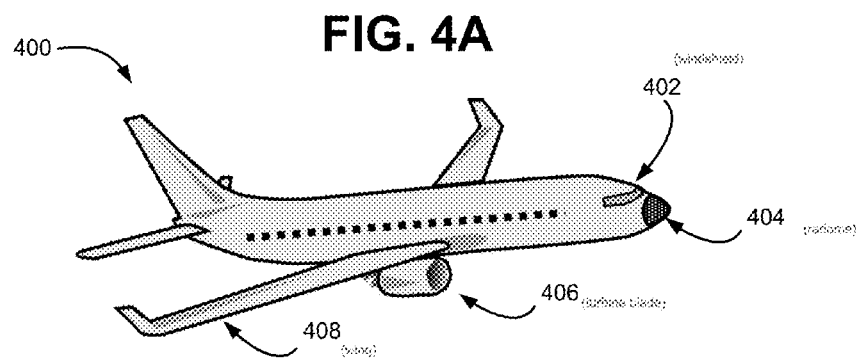
FIG. 4A is an example diagram of tag locations on an aircraft.
Figure 4B:
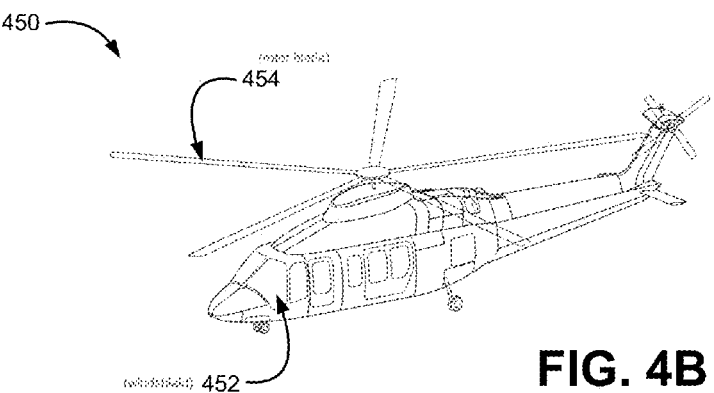
FIG. 4B is an example diagram of tag locations on an aircraft.

FIGS. 4A and 4B are illustrations of example aircraft with example locations for a wireless thickness estimation system. FIG. 4A is an illustration of an example aircraft 400. Example locations on aircraft 400 include a windshield 402, a radome 404, a turbine engine blade 406, or a wing 408. FIG. 4B is an illustration of an example vertical lift aircraft 450. Example locations on vertical lift aircraft 450 include windshield 452 and rotor blade 454. A wireless thickness estimation system can be used on these or other locations. For example, one or more tag devices could be located beneath the outer surface of radome 404. In some cases, one or more markings can be present on the surface to show the location of a tag device. For example, a visible dot or crosshairs can be located on the surface to indicate a tag device beneath.

Figure 5:
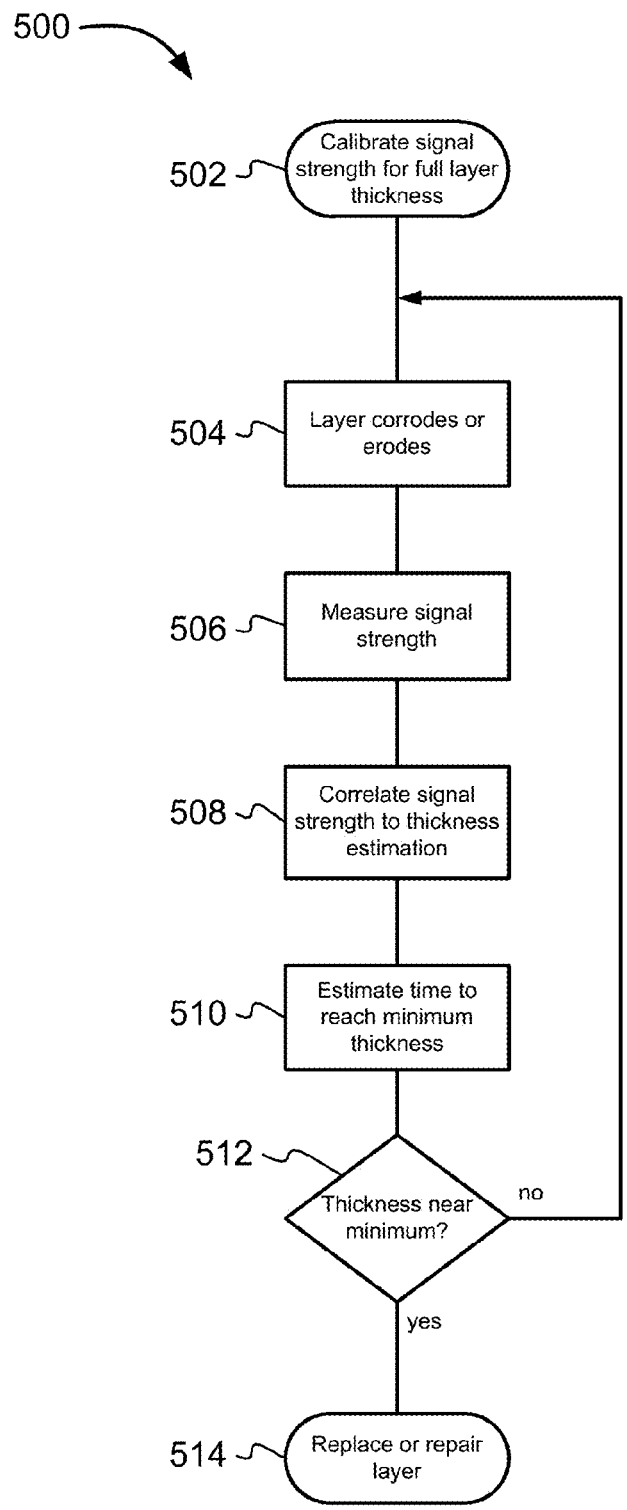
FIG. 5 is a flow chart showing an example process for a wireless thickness estimation system.

FIG. 5 is a flow chart diagram of example wireless thickness estimation process 300. The example wireless thickness estimation process 500 is a process to estimate the thickness of a material layer on a surface of an aircraft or aircraft part. The example process 500 can be based on the wireless system described in FIG. 1.

At 502, the wireless system is calibrated. For calibration, the thickness of a new material layer can be estimated using, for example, the transceiver device 200 of FIG. 2 and logged for comparison with subsequent measurements of that layer. The calibration can also be used to verify the wireless system is working properly if the thickness of a new layer is known. Alternately or in combination, the calibration could be used to verify that a new layer has a thickness within a specified tolerance. In other instances, a layer that is not new (i.e. has eroded some amount) can be used for calibration.

At 504, the material layer corrodes or erodes. For example, the material layer can erode during use (e.g. in flight), decreasing the thickness of the layer. At 506, the signal strength is measured using, for example, the transceiver device 200.

At 508, the measured signal strength is correlated to an estimation of the thickness of the material layer. In some instances, the thickness is estimated by calculating from the signal strength based on an algorithm. In some instances, the thickness can be estimated using a table lookup identifying thickness values correlated with signal strength values.

At 510, the approximate time until the layer has reached a threshold thickness is calculated. The threshold thickness can be a threshold specified for that specific material layer, that specific aircraft part, or that location on the layer or part. The approximate time can be calculated using an algorithm or statistical techniques. The approximate time can be calculated based on one or more thickness measurements.

At 512, the approximate time calculated at 510 is above some set time threshold (e.g. within some number of hours of operation), or the layer has not eroded sufficiently to warrant repair or replacement. Thus, the part or surface can be used until a subsequent measurement is taken. If the approximate time calculated at 510 is at or below some set time threshold, the part or layer can be repaired or replaced (at 514). In some implementations, the estimated thickness is compared directly with the threshold thickness, and an approximate time is not calculated or is unused.

Figure 6:
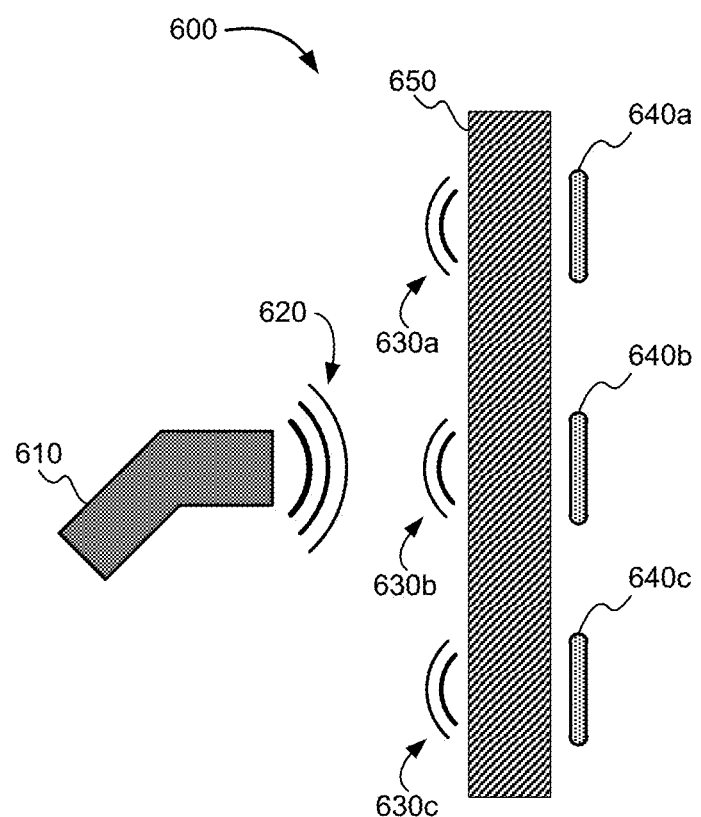
FIG. 6 is a schematic diagram of an example wireless thickness estimation system including multiple tag devices.

FIG. 6 shows an example wireless thickness estimation system 600. The example wireless system 600 is substantially similar to the wireless system 100. In wireless system 600, the example transceiver device 610 is able to communicate with multiple example tag devices 640a, 640b, and 640c that are located beneath a material layer 650. In some implementations, more or fewer tag devices are used, and the tag devices can be in any configuration or distribution. The transceiver 610 can send a signal 620 that is received by the multiple tag devices 640a, 640b, 640c. The tag devices 640a, 640b, 640c can send signals 630a, 630b, 630c, respectively, that are received by the transceiver 610.

In some cases, the wireless thickness estimation system 600 can be used to take a single measurement of material layer 650 using multiple tag devices 640a, 640b, 640c. In this situation, the transceiver device 610 does not have to be located directly opposite a tag device. The transceiver device 610 can use an algorithm to compute the thickness of material layer 650 based on the signal strength of signals 630a, 630b, 630c and other signal information (e.g. tag identification signals) received from tag devices 640a, 640b, 640c. For example, the transceiver device 610 can triangulate its location relative to one or more tag devices 640a, 640b, 640c. The transceiver device 610 can then compensate for tag device location when calculating the thickness of material layer 650. In some cases, multiple signals can be processed to determine an average material layer thickness. In some cases, the locations or distribution of tag devices is known, and a thickness estimation algorithm that the transceiver device 610 uses can be based on these known locations.

The wireless thickness estimation system described herein could also be used to monitor the thickness of a layer as the thickness increases. In some implementations, a tag device could be located beneath a layer or part upon which a residue accumulates over time. In this manner, the thickness of residue could be monitored and the part could be cleaned, repaired, or replaced if the accumulated thickness exceeds some threshold.

The wireless thickness estimation system described herein does not necessitate the removal of the part or component. Removing a part to evaluate the thickness of a layer on the part can be expensive and time-consuming. The wireless thickness estimation system enables a measurement of wear or damage to be determined instantly without disassembly. The wireless system can also predict when a material layer approaches a threshold thickness, so the material layer can be replaced or repaired when pass the threshold thickness. The wireless system can be used on stationary components or moving components. The tag devices can be placed or buried beneath any thickness of material layer. The material layers can include materials such as plastics, composites, metals, natural fiber materials, or other materials. The tag devices can be passive devices that do or do not have a battery and that activates to broadcast signals when turned on, or the tag devices can be active devices that broadcast signals at all times. The tag devices can also be low-profile devices that do not add appreciable weight or thickness to parts or surfaces.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A wireless system for estimating a thickness of a material layer adjacent a surface of an aircraft component, comprising:
   a plurality of tag devices located between a portion of the material layer and a portion of the surface, each tag device capable of wireless communication, wherein the material layer comprises a thickness that decreases over time in response to the aircraft component being used;
   a transceiver configured to wirelessly communicate with the plurality of tag devices, wherein a signal strength of each of wireless signals received from the corresponding tag device from the plurality of tag devices and by the transceiver varies with the thickness of the material layer; and
   one or more processors connected to the transceiver and configured to calculate the thickness of the material layer based on the signal strengths and tag identification information of the wireless signals from the plurality of tag devices, the one or more processors configured to triangulate a relative position between the transceiver and the plurality of tag devices to compensate for the relative position when determining the thickness of the material layer.

2. The wireless system of claim 1, wherein the tag device wireless communicates using an electromagnetic signal, and the electromagnetic signal includes at least one of a radio frequency signal, a high-frequency signal, an ultra-high-frequency signals, a signal having a frequency lower than radio frequency, or a signal having a frequency higher than ultra-high-frequency.

3. The wireless system of claim 1, wherein the tag device is an RFID device.

4. The wireless system of claim 1, wherein the tag device is a passive device.

5. The wireless system of claim 1, wherein the tag device is an active device.

6. The wireless system of claim 1, wherein the material layer comprises a sacrificial layer.

7. The wireless system of claim 1, wherein the aircraft component comprises a rotor blade on a vertical life aircraft, a blade of a turbine engine, a radome of an aircraft, a wing of an aircraft, or a windshield of an aircraft.

8. The wireless system of claim 1, wherein the one or more processors further compare the calculated thickness of the material layer to a specified threshold thickness and providing a notification that the aircraft component should be replaced or repaired whenever the calculated thickness is less than the specified threshold thickness.

9. The wireless system of claim 8, wherein the one or more processors further determines an estimated time in which the calculated thickness of the material layer will be equal to or less than the specified threshold thickness.

10. A transceiver device for estimating a thickness of a material layer on a surface of an aircraft component, comprising:
a transceiver configured to wireless communicate with a plurality of tag devices, wherein the tag devices are located between a portion of the surface of the aircraft component and a portion of the material layer adjacent the surface of the aircraft component, wherein the material layer comprises a thickness that decreases over time in response to the aircraft component being used; and
one or more processors connected to the transceiver and configured to receive a wireless signal from each of the plurality of tag devices, measure a signal strength of the wireless signal, and calculate the thickness of the material layer based on the signal strengths and tag identification information of the wireless signals from the plurality of tag devices, the one or more processor configured to triangulate a relative position between the transceiver and the plurality of tag devices to compensate for the relative position when determining the thickness of the material layer.

11. The transceiver device of claim 10, wherein the tag device wireless communicates using an electromagnetic signal, and the electromagnetic signal includes at least one of a radio frequency signal, a high-frequency signal, an ultra-high-frequency signals, a signal having a frequency lower than radio frequency, or a signal having a frequency higher than ultra-high-frequency.

12. The transceiver device of claim 10, wherein the tag device is an RFID device.

13. The transceiver device of claim 10, wherein the tag device is a passive device.

14. The transceiver device of claim 10, wherein the tag device is an active device.

15. The transceiver device of claim 10, wherein the material layer comprises a sacrificial layer.

16. The transceiver device of claim 10, wherein the aircraft component comprises a rotor blade on a vertical life aircraft, a blade of a turbine engine, a radome of an aircraft, a wing of an aircraft, or a windshield of an aircraft.

17. The transceiver device of claim 10, wherein the one or more processors further compare the thickness of the material layer to a specified threshold thickness and providing a notification that the aircraft component should be replaced or repaired whenever the calculated thickness is less than the specified threshold thickness.

18. The transceiver device of claim 17, wherein the one or more processors further determines an estimated time in which the thickness of the material layer will be equal to or less than the specified threshold thickness.

19. A method for estimating a thickness of a material layer on a surface of an aircraft component, the material layer comprising a plurality of tag devices, the method comprising:
transmitting from a transceiver, a wireless signal to the plurality of tag devices;
receiving a plurality of wireless signals responses from the plurality of tag devices at the transceiver in response to receiving the wireless signal from the transceiver, wherein each wireless signal response comprises tag identification information of the corresponding tag device;
triangulating, by the transceiver, a relative location of the transceiver to the tag devices based on a signal strength of the corresponding wireless signal response from the corresponding tag device; and
calculating, by one or more processors connected to the transceiver, a thickness of the material layer based on the signal strengths of the plurality of tag devices and the tag identification information of the plurality of tag devices, the one or more processors configured to triangulate a relative position between the transceiver and the plurality of tag devices to compensate for the relative position when determining the thickness of the material layer.

20. The method of claim 19, wherein the tag device wireless communicates using an electromagnetic signal, and the electromagnetic signal includes at least one of a radio frequency signal, a high-frequency signal, an ultra-high-frequency signals, a signal having a frequency lower than radio frequency, or a signal having a frequency higher than ultra-high-frequency.

21. The method of claim 19, wherein the tag device is an RFID device.

22. The method of claim 19, wherein the tag device is a passive device or an active device.

23. The method of claim 19, wherein the material layer comprises a sacrificial layer.

24. The method of claim 19, wherein the aircraft component comprises a rotor blade on a vertical life aircraft, a blade of a turbine engine, a radome of an aircraft, a wing of an aircraft, or a windshield of an aircraft.

25. The method of claim 19, further comprising comparing by the one or more processors, the calculated thickness of the material layer to a specified threshold thickness and providing a notification that the aircraft component should be replaced or repaired whenever the calculated thickness is less than the specified threshold thickness.

26. The method of claim 25, further comprising determining, by the one or more processors, an estimated time in which the calculated thickness of the material layer will be equal to or less than the specified threshold thickness.

* * * * *